UNITED STATES PATENT OFFICE.

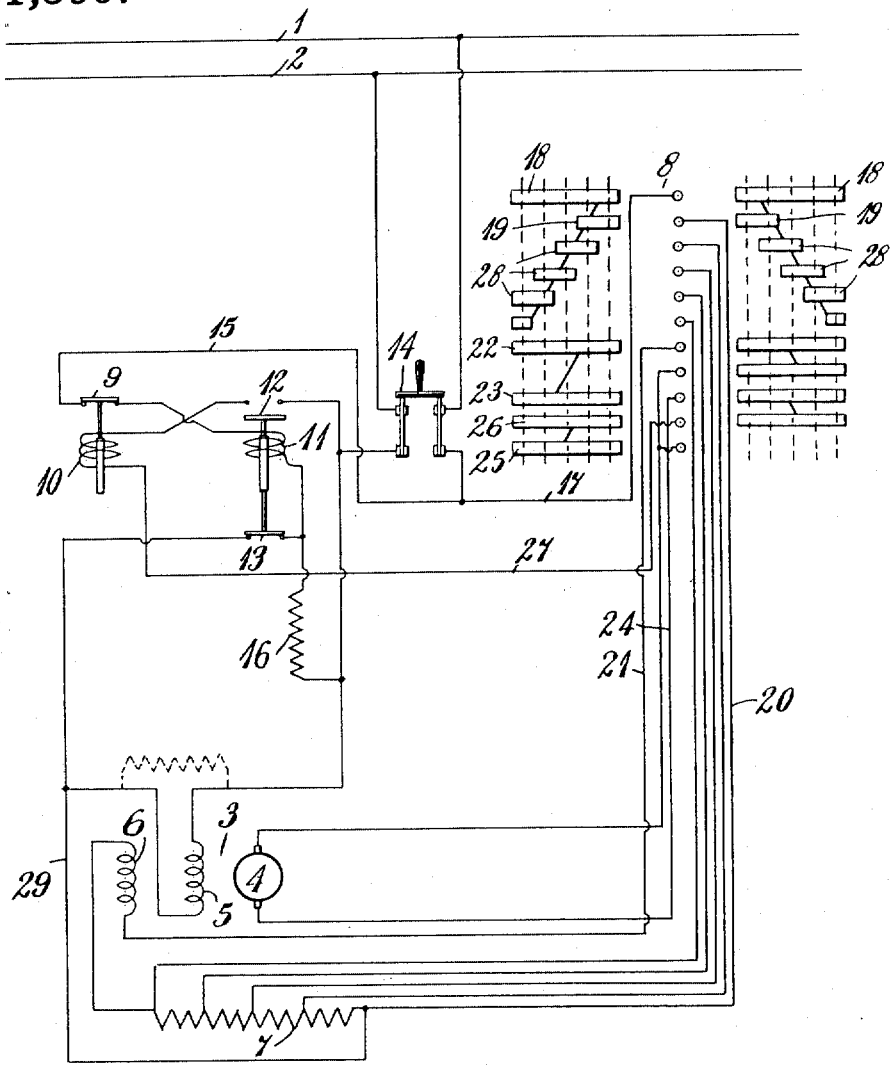

EDWARD A. HANFF, OF WILKINSBURG, PENNSYLVANIA, ASSIGNOR TO WESTINGHOUSE ELECTRIC AND MANUFACTURING COMPANY, A CORPORATION OF PENNSYLVANIA.

MOTOR-CONTROL SYSTEM.

1,231,599.     Specification of Letters Patent.     Patented July 3, 1917.

Application filed August 7, 1914. Serial No. 855,538.

*To all whom it may concern:*

Be it known that I, EDWARD A. HANFF, a citizen of the United States, and a resident of Wilkinsburg, in the county of Allegheny and State of Pennsylvania, have invented a new and useful Improvement in Motor-Control Systems, of which the following is a specification.

My invention relates to motor control systems and particularly to such systems as embody means for insuring the establishment of initial starting conditions in motor circuits before they can be closed, after having been opened because of abnormal circuit conditions.

My invention has for its object to provide a system of motor control which comprises a simple means for automatically preventing the closing of a motor circuit, after it has been opened because of abnormal circuit conditions, until the starting mechanism has been returned to its initial position.

In the operation of electric motors, overload devices are usually employed to open the motor circuit when the current traversing it exceeds a predetermined amount. If the motor is materially retarded by its mechanical load during such interruption of the circuit, an excessive rush of current may occur if the circuit is again completed without including the starting resistor. It is desirable, therefore, to employ an arrangement for insuring that the motor circuit will always initially include the starting resistor, which is gradually cut out as the motor is accelerated.

According to my present invention, I provide a system in which a switch for controlling the main circuit of the motor cannot be closed until the controller has been returned to its "off" position and initial starting conditions thus reëstablished. When the circuit of the actuating coil of the main switch is broken by an overload relay switch, the coil is short-circuited until the controller is in its initial position, with the starting resistor in circuit with the motor.

In the accompanying drawings, the single figure is a diagrammatic view of circuits and apparatus embodying my invention.

Line conductors 1 and 2, which may be connected to any suitable source of current, supply energy to an electric motor 3, the armature windings of which are indicated at 4, and which has shunt field windings 5 and series field windings 6. A sectional starting resistor 7, which is in series with the armature winding 4, is controlled by a controller 8. An overload relay switch 9, which comprises a series actuating coil 10, controls the circuit of a shunt actuating coil 11 of a switch 12 that is in the main circuit. A contact member 13, which is mechanically connected to the switch 12, operates to close a short circuit for the coil 11 when the switch 12 is in its open position, as will be later described.

To start the motor, a line switch 14 is closed and a circuit is completed, which extends from line conductor 1 through switch 14, conductor 15, switch 9, coil 11, resistor 16, and switch 14 to line conductor 2. The coil 11 is energized to close the switch 12. The controller 8 may be moved in either direction from its neutral or "off" position, according to the direction of rotation desired. If, for example, the controller is actuated to the right, as shown, a circuit is completed which extends from the positive line conductor 1 through switch 14, conductor 17, contact segments 18 and 19 of the controller, conductor 20, resistor 7, series field winding 6, conductor 21, contact segments 22 and 23, conductor 24, armature winding 4, contact segments 25 and 26, conductor 27, coil 10 and switches 12 and 14 to the negative line conductor 2. Further actuation of the controller causes an inclined group of contact segments 28 to successively short circuit the several sections of the resistor 7 and thus accelerate the motor.

If the controller 8 is advanced too rapidly, or if the motor load exceeds a predetermined amount, an excessive current will traverse the main circuit, and the coil 10 will be sufficiently energized to open the switch 9, which controls the circuit of the switch 12. The switch 12 then opens the main circuit and thereby deënergizes the series coil 10, allowing the switch 9 to close. The switch 12 cannot be reset to close the motor circuit until the controller 8 has been actuated to its "off" position. When the switch 12 opens, the contact member 13 closes a shunt circuit for the coil 11 which extends from the contact member 13 through conductors 29 and 20, contact segments 19 and 18, conductors 17 and 15, switch 9, and coil 11 to the contact member 13. In case the contact segment 19 has been advanced beyond its coöperating contact finger, the shunt circuit will be completed through one of the several contact segments 28 and a portion of the resistor 7, according to the position of the controller. The starting resistor 7 is of such low resistance that it does not allow the switch 12 to close.

It will be noted that this shunt circuit is maintained as long as the controller 8 is in an operative position but is broken at the contact segments 18 and 19 when the controller is moved to its "off" position, as illustrated. The coil 11 is thereupon again energized, by means of its circuit above described, to close the switch 12. The motor circuit can then be completed by the controller 8 with the entire resistor 7 included, as in starting the motor. The motor is then accelerated by gradually cutting out the resistor 7. When the controller is actuated in the reverse direction, the operation is the same except that the motor rotates in the opposite direction.

It will be noted that I provide a simple automatic arrangement for insuring that a motor circuit, which has opened because of abnormal conditions, cannot be completed until the initial starting conditions are established. This result is accomplished without the use of a controller having any structure in addition to that for performing its normal functions.

I claim as my invention:

1. In a system of motor control, the combination with a circuit comprising an electric motor, a resistor, a controller for said resistor, and a normally closed switch having a magnet coil, of means responsive to abnormal circuit conditions for opening said switch, and means for preventing the closing of said switch except when said controller is actuated to insert said resistor in circuit, said last named means comprising a shunt circuit for the magnet coil through said controller and exclusive of said resistor when the controller is in its initial operative position.

2. In a system of motor control, the combination with a circuit comprising an electric motor, a resistor, an electromagnetic switch having a coil, and a controller for said motor, of means responsive to abnormal circuit conditions for controlling the circuit of said coil, and means for establishing a shunt circuit for said coil through said controller and exclusive of said resistor when said switch is opened and said controller is in its initial operative position.

In testimony whereof, I have hereunto subscribed my name this 29th day of July, 1914.

EDWARD A. HANFF.

Witnesses:
D. H. HUNTER,
B. B. HINES.

Copies of this patent may be obtained for five cents each, by addressing the "Commissioner of Patents, Washington, D. C."